May 5, 1931. E. J. ABBE 1,804,047
INDUSTRIAL TRUCK
Filed Nov. 7, 1928 2 Sheets-Sheet 1
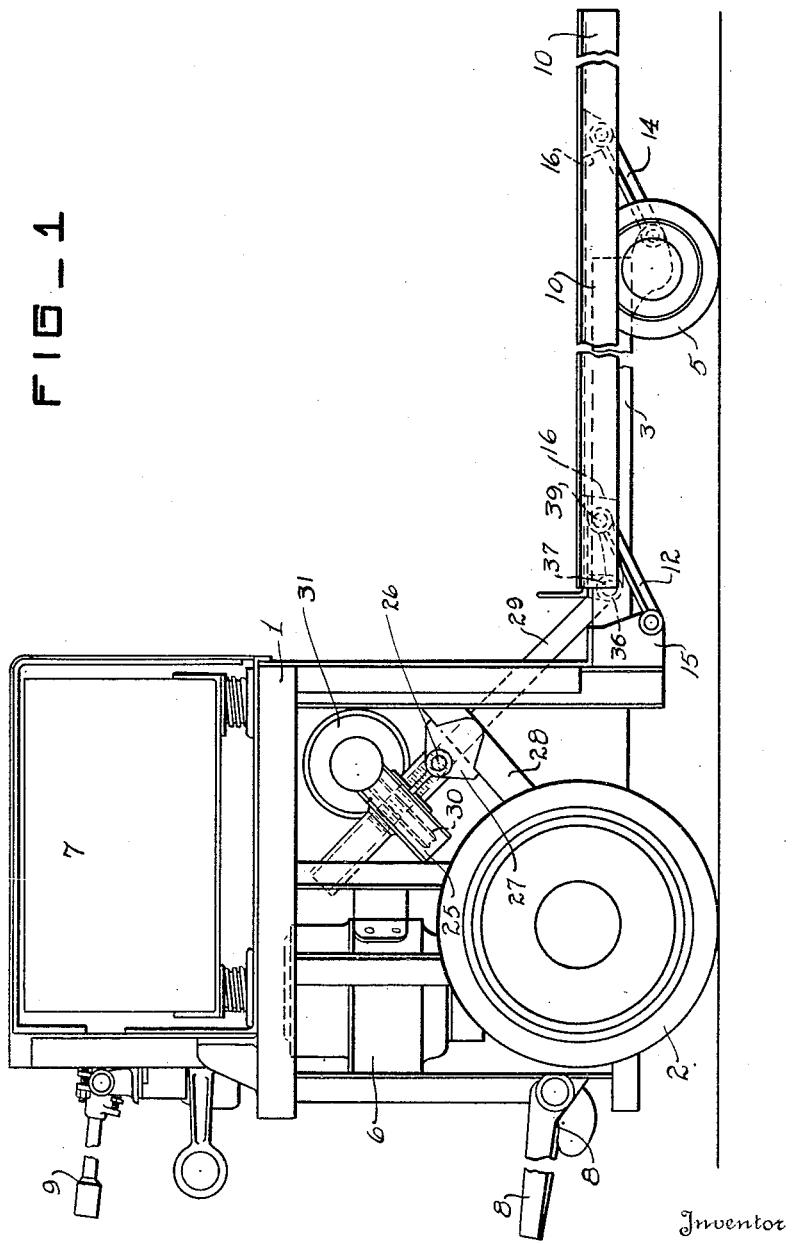
Inventor
Edward J. Abbe
By Bates, Gobrick & Teare
Attorneys May 5, 1931.  E. J. ABBE  1,804,047
INDUSTRIAL TRUCK
Filed Nov. 7, 1928   2 Sheets-Sheet 2
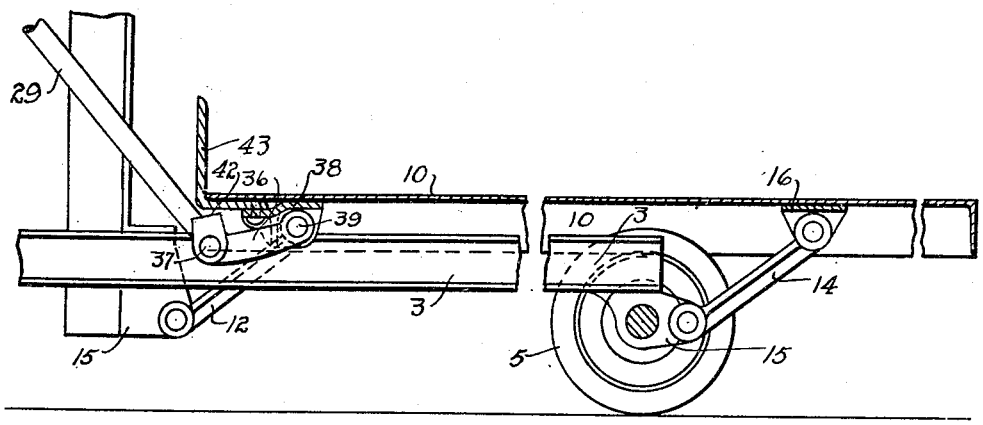
FIG_2
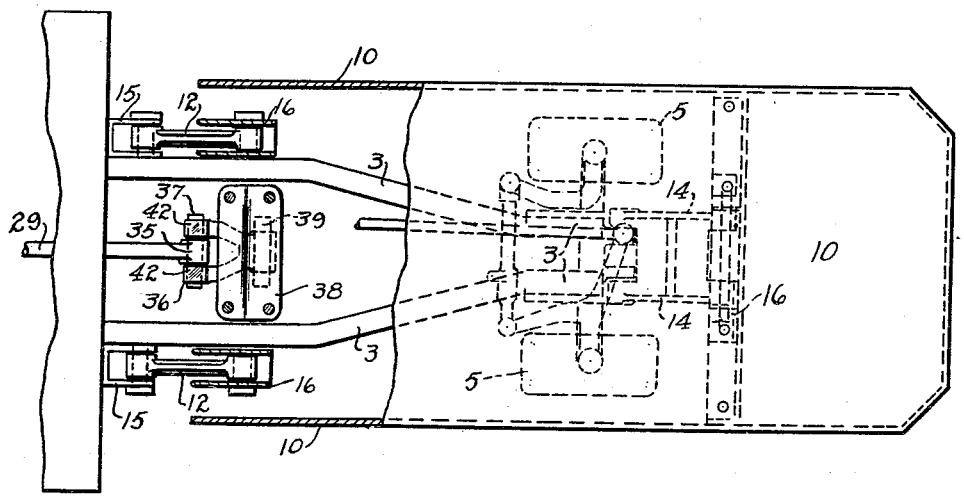
FIG_3
Inventor
Edward J. Abbe
By Bates, Goldrick & Teare
Attorneys Patented May 5, 1931

1,804,047

UNITED STATES PATENT OFFICE

EDWARD J. ABBE, OF CLEVELAND, OHIO, ASSIGNOR TO THE ELWELL-PARKER ELECTRIC COMPANY, OF CLEVELAND, OHIO, A CORPORATION OF OHIO

INDUSTRIAL TRUCK

Application filed November 7, 1928. Serial No. 317,846.

This invention relates to industrial trucks particularly of the low lift type, that is to say, trucks having a platform or load carrier adapted to lift a load from a floor a sufficient distance to enable the load to be transported by manipulation of the truck and then set down in a new location. Usually the platform or equivalent load lifting and carrying member overhangs the front end of the supporting framework of the truck, and, consequently, if the truck should be driven head on into a building wall or column, due to carelessness on the part of the operator, considerable damage may result, particularly to the platform raising and lowering mechanism. For example, where the raising and lowering mechanism comprises a power operated pushing and pulling device, such as a screw ram, the threads of the screw may be stripped, or the ram otherwise broken.

An object of this invention is to provide a safety device for an industrial truck which will operate to prevent damage to the truck under conditions such as just outlined.

A more specific object is to provide a safety device in connection with a load lifting member having positively acting raising and lowering means, wherein the platform may be shifted, as by impact with a wall, without disarrangement of such means.

Low lift truck platforms may be mounted on the truck frame in such manner as to shift longitudinally of the truck during elevation thereof as when links or inclined blocks are used to make the connection between the platform and frame. The invention is particularly adapted to such type of truck, an example of which is shown in prior patent to Clyde E. Cochran No. 1,260,145, issued March 19th, 1918. The truck herein shown is similar to that shown in the patent.

Further objects and features of the invention will become apparent from the following description relating to the accompanying drawings. The essential characteristics are summarized in the claims.

In the drawings hereof, Fig. 1 shows a side elevation of an industrial truck with my invention incorporated therewith and showing the load carrying platform in substantially lowered position; Fig. 2 is a substantially central longitudinal cross sectional view of the front or platform carrying portions of the truck, the platform being illustrated in partially raised position; Fig. 3 is a plan view showing the forward portion of the truck partly broken away to better illustrate the invention.

Referring in detail to the drawings, 1 designates the main frame of the truck beneath which are mounted a pair of traction wheels 2, one being shown in Fig. 1. Extending forwardly from the main frame is a low slung frame extension 3 beneath which are carried suitable dirigible wheels 5. Suitable means for driving the traction wheels may comprise a motor 6 mounted on the main frame and suitably connected to the traction wheels, together with a power supply such as storage batteries, mounted in a convenient housing 7 within the main frame of the truck. The operator's position is rearwardly of the main frame and the truck control includes movable platform members 8 on which he stands within reach of certain other controls, including a steering arm 9, suitably connected to the dirigible wheels.

The platform is designated 10 and as shown, protrudes beyond the low slung frame extension 3, forwardly of the truck. The platform may be of any suitable construction, and may be movably attached to the frame extension 3 as by parallel links 12 and 14, these being pivotally anchored to the platform and frame. As shown, the anchorages comprise brackets 15 on the frame and similar brackets 16 depending from the lower side of the platform.

As shown particularly in Fig. 1, the means for raising and lowering the platform may comprise a power operated screw jack having a main housing 25 mounted on trunnions 26, the trunnions being in turn supported by brackets 27 on inclined frame or strut members 28 within the main frame of the truck. The housing 25, as well shown in the above mentioned patent, contains a screw, the shank 29 of which extends downwardly adjacent the rear edge of the platform. Suitable means for operating the screw may comprise a worm gear 30, threaded onto the screw and arranged to be driven by a motor 31 mounted on the housing 25 and having a worm, (not shown) meshing with the worm gear.

The screw extension 29 has an eye 35 at its end which is positioned between the rearwardly forked end of a link 36, to which the eye may be secured, as by a through pivot bar 37. The link 36 extends forwardly beneath the platform and is supported at its forward end by a forked bracket 38 suitably attached to the under side of the platform and carrying a pivot bar 39 parallel to the pivot bar 37 and extending through the end of the link. As shown particularly in Figs. 2 and 3, the rear end of the link 36 carries upwardly extending abutments 42 which engage beneath the platform and directly against a structural angle member, designated 43, forming a rear cross brace for the platform.

In operation it will be seen that as the screw extension 29 is drawn upwardly by the operation of the motor 31 and its gearing, the abutment 42 rides on the structural member 43 and positively raises the platform by swinging the same about the links 12 and 14. Similarly under ordinary conditions the downward thrust of the screw extension 29 lowers the platform onto the low slung frame extension.

It will be seen that should the truck be driven against a wall with the platform in either raised or lowered position, the horizontal component of the force tending to break the screw mechanism will be taken up by the frame of the truck and the vertical component will cause the platform to be raised in an arcuate path determined by the length of the links 12 and 14, the rear end of the safety link 36 simply swinging down freely and transmitting practically none of the force of the blow to the screw and associated mechanism. Further, it will be seen that in the event there is an obstruction opposing the lowering movement of the platform, the abutment member 42 of the link 36 will be simply swung away from the platform, the motor and gearing housing likewise swinging downwardly, wherefore no breakage can result either to the platform or the screw and its driving means.

I claim:—

1. In an industrial truck, a frame, a movable load carrier, means acting positively in two directions, carried by the frame and connected to the carrier to move it, the connection including a safety device arranged to permit shifting movement of the carrier relative to the frame and said means to prevent damage to said means in the event of the carrier being abnormally forced to move with relation to the frame.

2. In an industrial truck, a frame having a low slung forward extension, a movable load carrier mounted over said extension, means acting positively in two directions, carried by the frame and connected to the carrier to move it, the connection including a safety device arranged to permit shifting movement of the carrier relative to the frame and said means in one such direction of action only, to thereby prevent damage to said means in the event of the carrier being abnormally forced to move with relation to the frame in such direction.

3. In a load handling truck, a frame, a load carrier raisably supported on the frame, lifting means carried on the frame and connected to the carrier, the connection including a rigid member pivoted at respective ends to the carrier and a part of said means, a portion of the member bearing upwardly against the carrier to sustain the weight thereof during the raising of the carrier, and being swingable away from the carrier to permit the carrier to be forced to raised position without danger of breaking said means.

4. In a load handling truck, a frame, a load lifting member carried by the frame and movable relative thereto, pushing and pulling means interposed between the member and frame for raising and lowering the load lifting member, and a device connecting said means and member arranged to normally occupy a fixed position with relation to said member and arranged to move with relation to said member only in the event of externally applied force on the member tending to move the member against the restraining action of said means.

5. In an industrial truck, a frame, a raisable load carrier having a connection with the frame arranged to cause the carrier to shift horizontally when lifted, load raising and lowering means movably carried by the frame and connected to the carrier, the connection including a link pivoted to the said means and carrier at horizontally offset points and detachably abutting the under side of the carrier at the end thereof which is pivoted to said means to thereby permit raising movement of the carrier relative to the frame and said means.

6. In an industrial truck, a frame, a load carrying member supported by the frame and movable horizontally and vertically relative thereto, pushing and pulling means interposed between the member and frame for raising and lowering the load carrying member, and a device pivotally connecting said means and member and arranged to normally bear upwardly on the lower side of the member to cause the means to lift the member, and arranged to separate from said member at the point of such bearing in case of extrinsic force applied to the member likely to damage the pushing and pulling means.

7. In an industrial truck, a main frame having a low slung forwardly extending portion, a load carrier raisably mounted on the low slung frame portion, a power jack pivotally mounted on the frame and having an operating part extending downwardly and connected to the carrier for raising and lowering the same, the connection comprising a link pivoted to the carrier and extending rearwardly beneath the same and supportingly engaging it, the operating part of the jack being pivoted to the link adjacent the point of support between the link and carrier, whereby extrinsic force tending to shift the carrier either rearwardly or upwardly will cause the link and power jack to swing and thereby prevent breakage of the jack.

In testimony whereof, I hereunto affix my signature.

EDWARD J. ABBE.